United States Patent [19]

Lesieur

[11] Patent Number: 4,524,113
[45] Date of Patent: Jun. 18, 1985

[54] DIRECT USE OF METHANOL FUEL IN A MOLTEN CARBONATE FUEL CELL

[75] Inventor: Roger R. Lesieur, Enfield, Conn.

[73] Assignee: United Technologies Corporation, Hartford, Conn.

[21] Appl. No.: 605,457

[22] Filed: Apr. 30, 1984

Related U.S. Application Data

[63] Continuation-in-part of Ser. No. 510,507, Jul. 5, 1983, abandoned.

[51] Int. Cl.$^3$ ............................................. H01M 8/14
[52] U.S. Cl. ...................................... 429/16; 429/40
[58] Field of Search ............................. 429/16, 17, 40

[56] References Cited

U.S. PATENT DOCUMENTS

| | | | |
|---|---|---|---|
| 3,453,146 | 7/1969 | Bawa et al. | 136/86 |
| 3,532,547 | 10/1970 | Vahldicek et al. | 429/17 |
| 3,537,395 | 11/1970 | Bartos | 429/17 |
| 3,544,374 | 12/1970 | D'Alessandro et al. | 429/16 |
| 4,182,795 | 1/1980 | Baker et al. | 429/13 |
| 4,390,603 | 6/1983 | Kawana et al. | 429/30 |

Primary Examiner—Charles F. LeFevour
Attorney, Agent, or Firm—Alan C. Cohen

[57] ABSTRACT

A method of powering a high temperature molten carbonate fuel cell using direct internal reformation of methanol. The methanol is reformed spontaneously using the anode catalyst and cell waste heat creating hydrogen which is consumed as fuel at the anode and carbon dioxide which is used to enrich the cathode oxidant. In addition, the reformation reaction is endothermic and therefore will aid in managing excess heat at the anode.

2 Claims, 3 Drawing Figures

4,524,113

DIRECT USE OF METHANOL FUEL IN A MOLTEN CARBONATE FUEL CELL

CROSS REFERENCE TO RELATED APPLICATION

This is a Continuation-in-Part of application Ser. No. 510,507 filed on July 5, 1983 now abandoned.

DESCRIPTION

1. Technical Field

The invention relates to a method of producing electrical power using high-temperature fuel cells.

2. Background Art

High temperature fuel cells typically have a molten carbonate electrolyte disposed between an anode and a cathode. The typical fuel cell operates on hydrogen fuel and air oxidant. The reaction at the anode is shown by the equation $$H_2 + CO_3'' \rightarrow H_2O + CO_2 + 2e' \quad (1)$$

while the cathodic reaction is $$CO_2 + \tfrac{1}{2}O_2 + 2e' \rightarrow CO_3''. \quad (2)$$

From the equations, it is apparent that the reaction requires hydrogen for fuel and carbon dioxide enriched oxygen as oxidant. One source for both of these materials is hydrocarbon gases particularly methane. A process for producing hydrogen and carbon dioxide from such hydrocarbons is called steam reformation and has been used in the past to provide fuel for fuel cells. For example, see commonly assigned U.S. Pat. No. 3,615,839. The reaction to produce the hydrogen is as follows:

$$CH_4 + H_2O \xrightarrow{heat} CO + 3H_2 \quad (3)$$

The '839 patent describes a process in which methane is preheated to 1000° F. (538° C.) and fed into a nickel catalyst packed fuel compartment behind the anode where the cell heat and product water reform the gas as in equation 3. In order to make the reformation more efficient, the carbon monoxide generated in this reaction is further reacted in what is commonly called a shift reaction to produce carbon dioxide and more hydrogen.

$$CO + H_2O \rightarrow CO_2 + H_2 \quad (4)$$

The stability of the gaseous hydrocarbon molecules, especially methane, has necessitated the use of special reforming catalysts as well as high temperature pretreatments to initiate the reformation (U.S. Pat. No. 3,146,131). In either case, the temperature of the gases is raised to about that of the operating fuel cell 932° F. (500° C.). Both the use of the special catalyst and the preheating of the gases outside of the fuel cell increase the cost of construction and of operation for one of these fuel cells, as well as decreasing their efficiency. These factors, plus the increasing cost of gaseous hydrocarbons and a potential shortage of supply makes alternative fuels more attractive. The use of methanol in fuel cells operating with potassium hydroxide electrolyte have also been disclosed, however these cells suffer from the formation of carbonic acids and lead to a deterioration in the cells performance, U.S. Pat. Nos. 3,925,009 and 3,703,416.

Accordingly, what is needed in this art is a less complex, less expensive source of hydrogen for use in high temperature fuel cells.

DISCLOSURE OF INVENTION

The invention is directed toward a method of generating electrical energy by steam reforming methanol inside the anode of a high temperature molten carbonate fuel cell. This method comprises introducing methanol into an anode cavity, contacting the methanol with the anode catalyst in the presence of heat and water, thereby producing hydrogen and carbon dioxide from the reformed methanol.

$$CH_3OH + H_2O + heat \rightarrow 3H_2 + CO_2 \quad (5)$$

No special catalyst need be employed. Any of the anode catalysts commonly being used in such high temperature fuel cells will be satisfactory, i.e. U.S. Pat. No. 4,239,557, which is incorporated herein by reference. The hydrogen is then further reacted with the catalyst as in Equation 1 while the $CO_2$ rich gas may be expelled through the exhaust to the atmosphere or used to enrich the oxidant with carbon dioxide to aid in the cathode reaction as shown in Equation 2.

Other objects, features and advantages of the present invention will become more apparent from the following detailed description of the preferred embodiment and accompanying drawings.

BEST MODE FOR CARRYING OUT THE INVENTION

Figure 1:
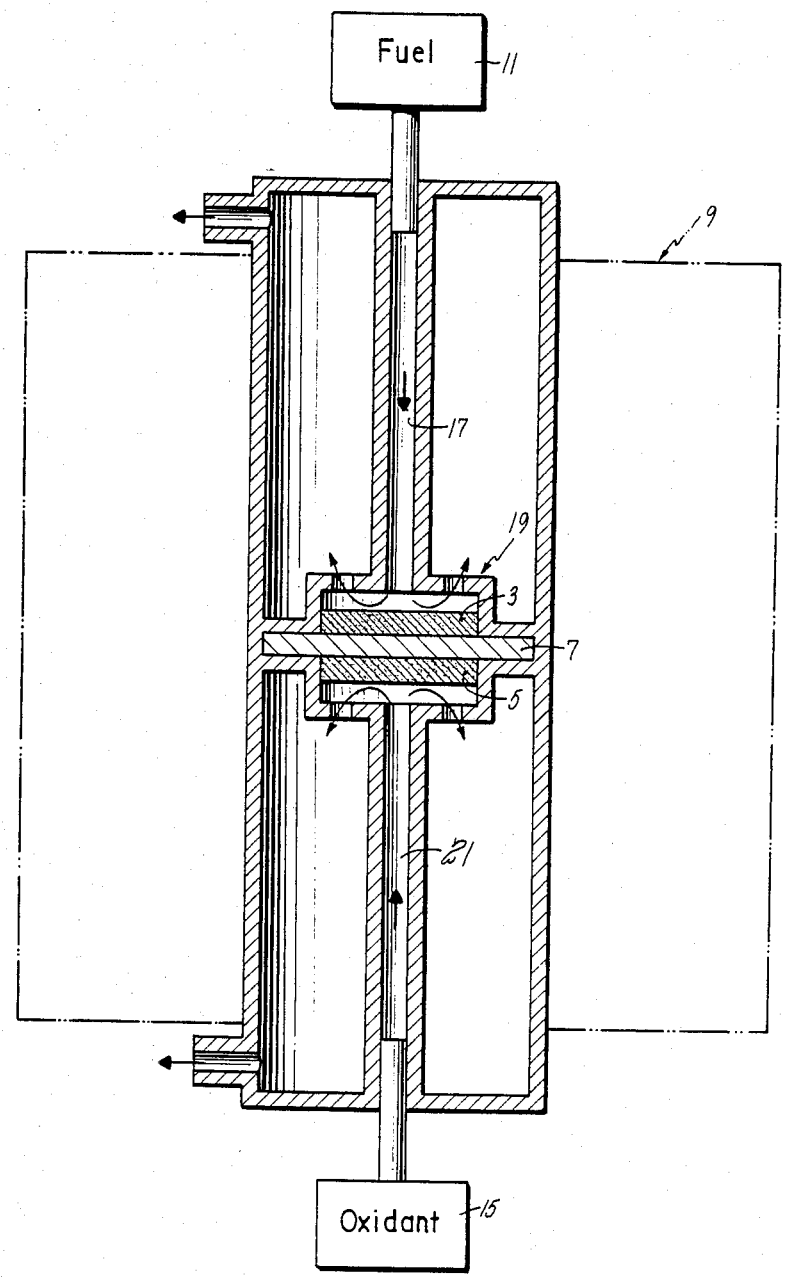
FIG. 1 is a schematic of a molten carbonate fuel cell powered by methanol.

FIG. 1 shows a molten carbonate fuel cell 19 comprising an anode 3, a cathode 5 and a molten carbonate electrolyte 7 disposed therebetween, as well as a fuel passageway 17 and an oxidant passageway 21. Surrounding the fuel cell is a heat source 9 capable of preheating the fuel cell to its operating temperature of about 1100° F. to about 1400° F. (593° C. to 760° C.). When multiple fuel cell units are used forming a fuel cell stack, the operating fuel cells produce excess heat from the primary fuel cell reactions (equations 1 and 2) so that the cell does not require an external heat source, after initial start-up. Such a fuel cell is conventional and does not comprise a part of the present invention. It should be noted that the figure is only meant to be illustrative and exemplary and not meant to be limiting.

The present invention entails introducing methanol into the anode fuel passageway wherein it will come into contact with the anode. At the cell operating temperature, and through the agency of the anode catalyst in the presence of water, the methanol is steam reformed to produce hydrogen and carbon dioxide in conformance with Equation 5. The hydrogen thus produced is then utilized, through the agency of the same anode catalyst, to produce free electrons as shown in Equation 1.

The methanol may be introduced into the fuel cell as a liquid or vapor, in either case it may be necessary to place the methanol under positive pressure, i.e. gravity feed or pump, when introducing it into the fuel cell.

The water required for the reaction, as is evident from Equation 5, must be one mole of water to reform one mole of methanol, and may be produced by the cell itself during the reaction of the hydrogen fuel with the carbonate electrolyte, as shown in Equation 1. However, if the water produced by the fuel cell should not prove to be sufficient for a particular fuel cell, water may be introduced into the anode chamber along with the methanol. The introduction of this water may be done by preparing a solution of methanol and water outside of the fuel cell, or in the alternative, both the water and methanol may be introduced separately into the anode wherein the two constituents will mix and then react with the anode catalyst.

Simultaneously with the introduction of the fuel to the anode is the introduction of the oxidant to the cathode 5. The oxidant 15 is generally air, however, since the reaction at the cathode requires $CO_2$, enriching the oxidant with $CO_2$ is preferred. Using the present process, it may be possible to enrich the oxidant with $CO_2$ by mixing it with the $CO_2$ rich effluent from the anode.

Although the above description is in terms of a single fuel cell unit, it should be noted that this procedure will work just as well in a stack comprising a plurality of cells.

EXAMPLE

Figure 3:
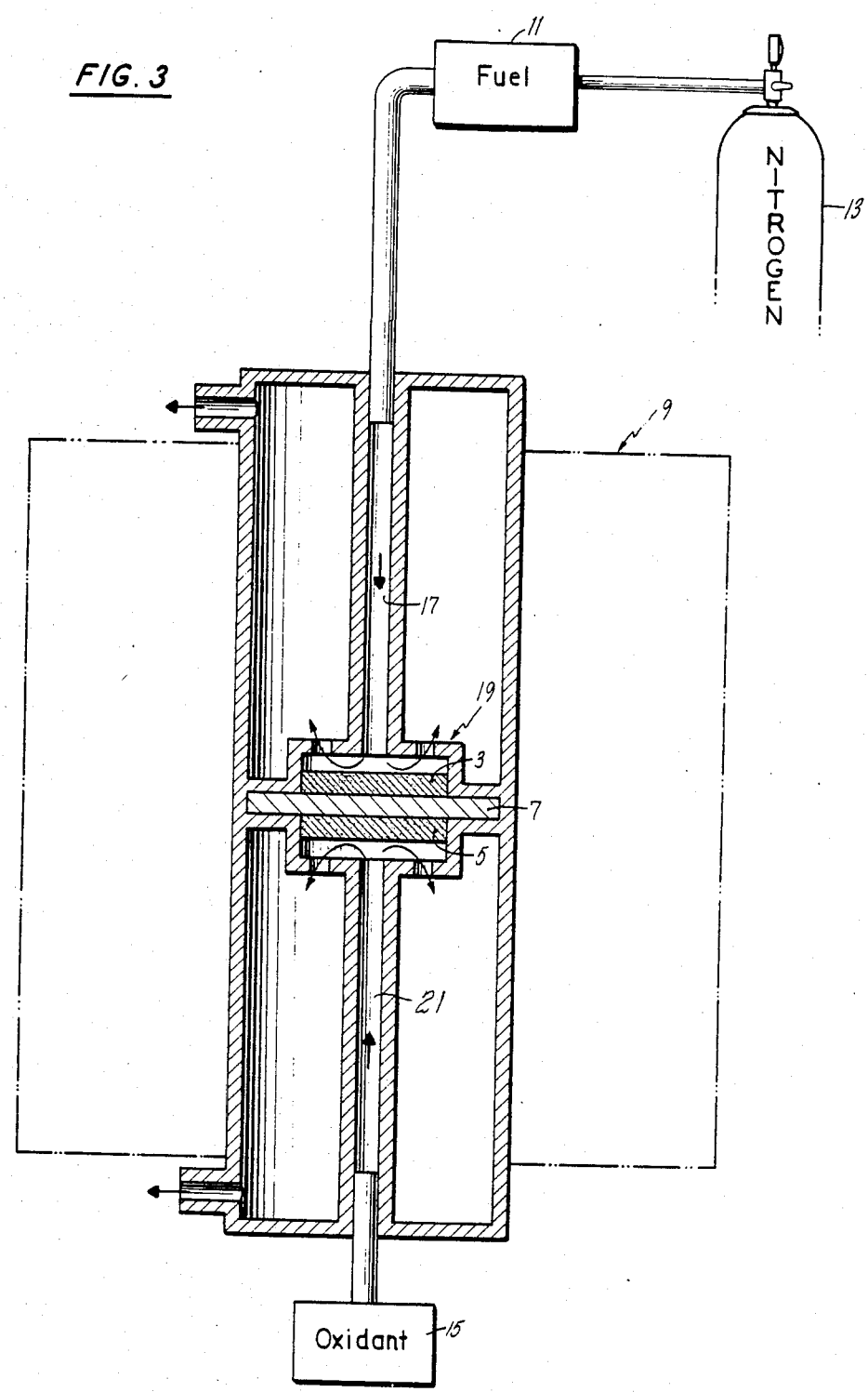
FIG. 3 is a cross section of the fuel cell used in the Example.

A molten carbonate test cell was prepared as shown in FIG. 3. The electrode was circular in cross-sectional design and contained 3 cm$^2$ of active catalyst area. The catalyst used in the anode 3, chromium stabilized nickel, and the cathode 5, nickel oxide, are conventional molten carbonate catalysts and are known to those skilled in the art. The fuel solution 11 was prepared by mixing 33 mls of methanol with 250 mls of $H_2O$ and warming to approximately 180° F. (82.2° C.). The oxidant 15 comprised a mixture of 11.7% (by vol.) $O_2$, 17.1% $CO_2$, 4% $H_2O$ and the balance $N_2$.

The cell was operated at 1211° F. (655° C.) with a constant oxidant flow rate of 100 cc/min to the cathode. The fuel was delivered to the anode by passing a stream of $N_2$ gas 13 through the warmed fuel solution 11.

The test cell, being of subscale dimension, required that the fuel be introduced under very low flow rates. Therefore, it proved to be easier to introduce the fuel into the anode by flowing an inert gas (nitrogen) through the warmed fuel solution, where the $N_2$ gas intermixed with the fuel and carried it into the anode. The quantity of fuel introduced to the anode was conveniently controlled by varying the flow rates of the nitrogen. While the nitrogen gas is employed in the subscale test cell, it is not necessary to use it in full scale fuel cells. However, it could also be used in full scale models if desired. The inert gas does not affect the reaction or the results of this example; it is merely a convenient medium for introducing the fuel. The temperature to which the solution in this example is preheated $\approx 180°$ F. ($\approx 82.2°$ C.) is a function of its subscale design. A full size fuel cell would utilize either liquid fuel or preheated fuel, depending on the cell design. In addition, the subscale design requires the cell to be heated from an external heating source to maintain its operating temperature; again, this would not be necessary in a full scale cell.

Figure 2:
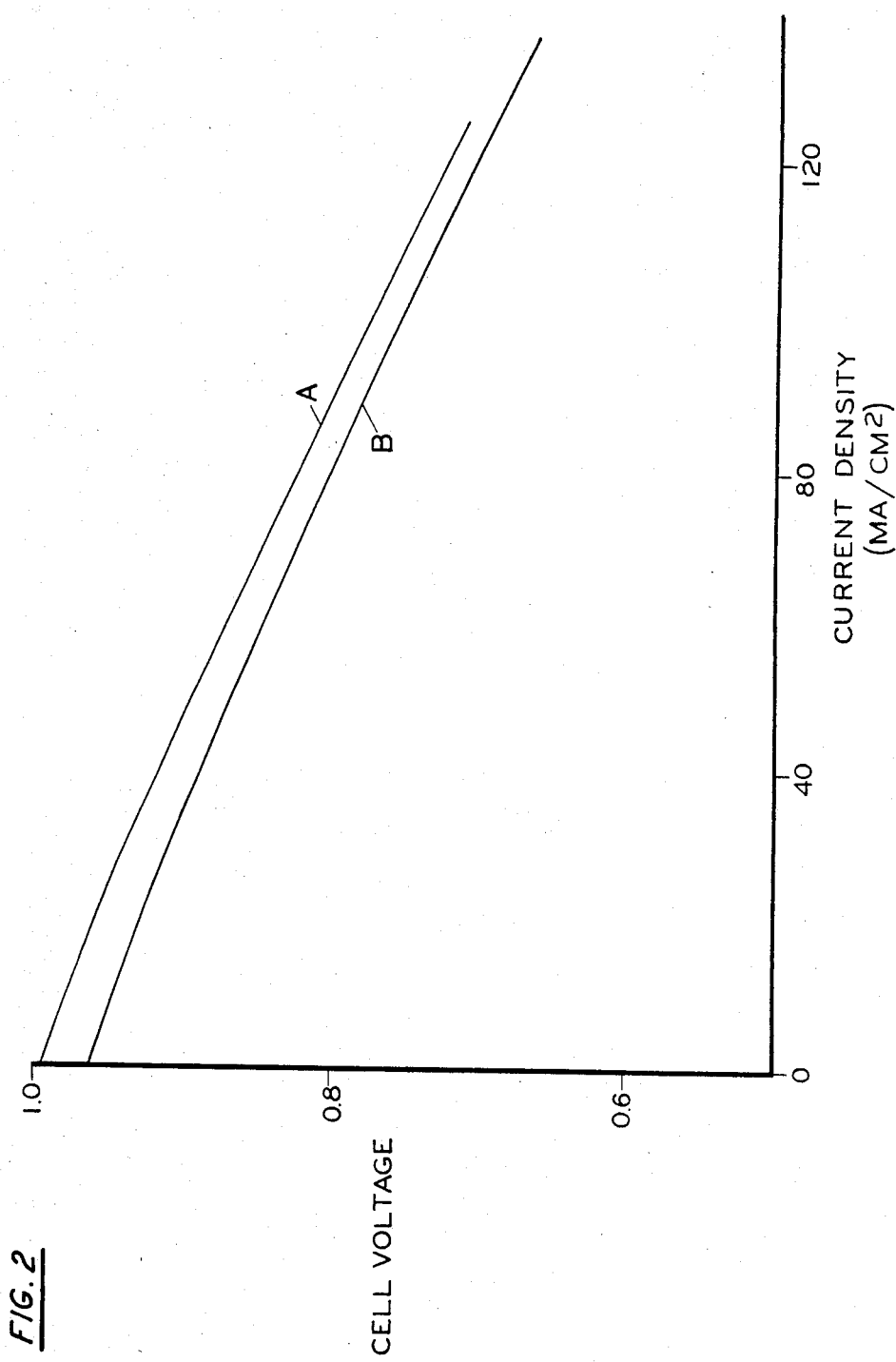
FIG. 2 is a graph comparing the power generated from different fuels. The present methanol and water solution, and simulated gases available from the reformation of naphtha, are shown.

Flow rates were varied from 3 cc/min to 100 cc/min to determine cell performance under different loading conditions. The fuel pressure was about ambient pressure at all times and the results of this test cell are shown in FIG. 2. The test data demonstrates that the cell efficiency using methanol (A) is very similar to that of a cell using reformed gas (B) with a composition of approximately 70%–80% $H_2$, 20%–25% $CO_2$ and 2%–5% CO on a dry weight basis.

The present invention utilizes a fuel which is increasing in supply and is relatively stable in its cost. Unlike the fuel cells of the past, which utilize hydrocarbon fuels requiring external reforming or special internal reforming catalysts, fuel cells of the present invention require no external reforming or special catalyst. The same catalyst is used to reform the fuel and to act as the anode in the electrochemical reaction. Such a system is easier, simpler and less costly to construct as well as to operate.

It should be understood that the invention is not limited to the particular embodiments shown and described herein, but that various changes and modifications may be made without departing from the spirit and scope of this novel concept as defined by the following claims.

I claim:

1. A method of operating a molten carbonate fuel cell having a catalyst containing anode, a cathode, a molten carbonate electrolyte disposed therebetween, and fuel and oxidant passageways operating at about 1100° F. (593° C.) to about 1400° F. (736° C.) utilizing hydrogen as the fuel wherein the improvement comprises:

introducing methanol into the fuel passageway, contacting the anode with said methanol in the presence of water at the operating temperature of the cell, thus causing the methanol to steam reform, producing hydrogen, carbon monoxide and carbon dioxide, and contacting the anode with the hydrogen fuel causing the hydrogen to oxidize producing free electrons.

2. The method of claim 1 wherein said water is a by-product of the electrochemical reaction of the hydrogen and electrolyte in the fuel cell.

* * * * *